O. B. POTTER.

SHOW-WINDOW.

No. 7,105. Reissued May 9, 1876.

WITNESSES:

A. W. Almqvist

Gustave Dittmar

INVENTOR:

Orlando B. Potter

BY

Munn & Co.

ATTORNEYS.

N. PETERS, PHOTO-LITHOGRAPHER, WASHINGTON, D. C.

UNITED STATES PATENT OFFICE.

ORLANDO B. POTTER, OF NEW YORK, N. Y.

IMPROVEMENT IN SHOW-WINDOWS.

Specification forming part of Letters Patent No. 172,485, dated January 18, 1876; reissue No. 7,105, dated May 9, 1876; application filed February 19, 1876.

*To all whom it may concern:*

Figure 1:
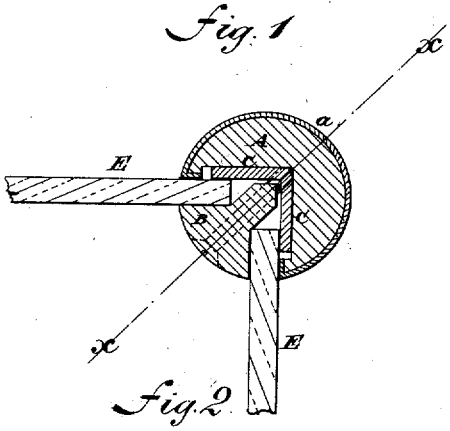
Figure 2:
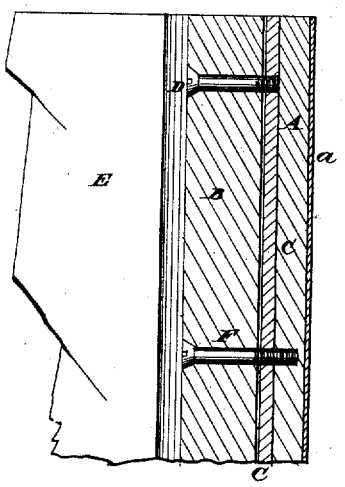

Be it known that I, ORLANDO B. POTTER, of the city, county, and State of New York, have invented a new and useful Improvement in Show-Windows, of which the following is a specification:

Figure 1 is a cross-section of a portion of a show-window illustrating my invention. Fig. 2 is a vertical section of the same, taken through the line *x x*, Fig. 1.

Similar letters of reference indicate corresponding parts.

The object of my invention is to facilitate the removal of the ordinary outside ornamental moldings of show-windows, for the purpose of repairing or replating the same, without disturbing the window-sash or the glass plates of the window.

In the ordinary construction of show-windows the ornamental moldings or exteriors of the window-stiles are either made in one piece with the stiles, or are so attached to the stiles that they cannot be removed for repair unless the glass of the window is also removed. The work of reparing and replacing the said ornamental moldings is, therefore, troublesome and expensive. I remedy the difficulty in the following manner:

I provide an ornamental molding, A, which, in the drawings, is represented as being made of wood covered with a strip of plated metal, *a*, but which molding may be made wholly of metal, wood, or other material, if desired.

The molding A is grooved or recessed upon the inner side to receive the part C of the stile, so that the said part may be entirely covered and concealed. The stile may be composed of two parts, B C, fastened together by screws D, the glasses E being held between the parts B C, as shown. The molding A is secured in place by screws F passing through the stile B C from the inner side, and screwed into the molding A, as shown in Fig. 2.

In the drawing the invention is represented as being applied to the angle of a window; but the construction is the same where the glasses E are in the same plane. By this construction, by removing the screws F, the molding A can be detached without disturbing the glass, or exposing it to any liability of falling out, enabling the molding to be conveniently replated or renewed without affecting the integrity of the window.

Having thus described my invention, what I claim as new, and desire to secure by Letters Patent, is—

The combination of the exterior molding A with the stile, substantially in the manner herein shown and described, so that the said molding can be readily removed for repair, and again restored without disturbing the integrity of the window.

ORLANDO B. POTTER.

Witnesses:

T. B. MOSHER,

ALEX. F. ROBERTS.